3,201,208
METHOD OF PRODUCING ANHYDROUS INORGANIC COMPOUNDS

Sidney M. Heins, Chicago, and Burton Strauss, Winnetka, Ill., assignors to Chemical Products Corporation, Chicago, Ill., a corporation of Illinois
No Drawing. Filed July 5, 1963, Ser. No. 293,198
8 Claims. (Cl. 23—300)

This invention concerns improvement in the process of dehydrating aqueous solutions of inorganic compounds, and particularly improvement in the production of anhydrous zinc chloride and anhydrous magnesium chloride. Specifically, this invention is an improvement of the process disclosed in U.S. Patent No. 2,394,244 whereby the dehydration of zinc chloride and magnesium chloride solutions can be accomplished more rapidly and more economically than by the method of the said patent.

We have found that by adding sodium chloride or potassium chloride, or a mixture of the two, to the material to be dehydrated and cooking the mixture under a cover of mineral oil the time required for complete crystallization is very greatly reduced. It appears that the salt, added to the material to be dehydrated, forms an eutectic which crystallizes more rapidly because of its lower melting point. Thus, the production of the anhydrous compounds can be readily accomplished, more rapidly than heretofore, with relatively simple cooking equipment operating mainly at a relatively low temperature, i.e., the boiling point of water, so that a pressure vessel is not required.

Also, we have found that the dehydration of zinc chloride solutions and magnesium chloride solutions can be accomplished in an ordinary steam heated cooking kettle, by using a heavy mineral oil such as crude oil, cylinder oil, machine oil, furnace oil, or the like, instead of the lighter kerosene called for by the aforesaid patent, for sealing the dehydrating material from air, with the result that a material reduction in the cost of the dehydrating process is obtained. Any mineral oil having a high boiling point, i.e., above the boiling point of water, may be used. Such oil is floated on top of the solution being boiled and since the amount of oil lost by evaporation is quite small, as compared with the loss when keroseen is used, our improved process is very economical in this respect.

In practice we have found that the addition of salt in an amount equal to from thirty to fifty percent by weight of the total anhydrous end product, together with sufficient crude oil to maintain the batch covered with oil to at least a depth of about one inch, will reduce the cooking time for complete crystallization to less than one-half of that required by the process of the said Patent No. 2,394,244. Furthermore, with a steam-coil heated kettle the temperature of the material being processed is kept substantially constant and need be substantially no higher than the boiling point of water while the main body of fluid is being evaporated. Thus for the dehydration of a 23% magnesium chloride solution by our improved process complete dehydration can be had in from 1 to 1¾ hours as compared with substantially 3 hours for the dehydration of a like amount of magnesium chloride by the process of the said Patent #2,394,244. When the drying is completed the oil is removed by decantation leaving a clean product comprising an intimate mixture of the salt and the crystallized magnesium chloride.

While either sodium chloride alone or potassium chloride alone may be used for our process, depending upon the use of the end product, we have found that in the dehydration of magnesium chloride solution a half and half mixture of sodium chloride and potassium chloride results in faster drying time than when only one or the other of the salts is used. This also applied to the production of anhydrous zinc chloride wherein the process is carried out in the same manner as for the production of anhydrous magnesium chloride, the only difference being that a longer cooking time is required for dehydration of the zinc chloride solution than in the case of the magnesium chloride solution.

Typical examples of our improved process for the production of anhydrous magnesium chloride and anhydrous zinc chloride are as follows:

ANHYDROUS MAGNESIUM CHLORIDE

Example I 50 pounds $MgCl_2$ in solution
25 pounds NaCl
25 pounds KCl
100 pounds #5 furnace oil floated on top of batch. Batch heated by steam at 350–400° F. and completely crystallized in approx. 1¼ hours.

Example II 70 pounds $MgCl_2$ in solution
15 pounds NaCl
15 pounds KCl
100 pounds machine oil on top of batch. Batch heated by steam at 350–400° F. and completely crystallized in approx. 1¼ hours.

Example III 70 pounds $MgCl_2$ in solution
30 pounds NaCl
100 pounds SAE 30 motor oil on top of batch. Heated by steam at 350–400° F. and completely crystallized in approx. 1¾ hours.

ANHYDROUS ZINC CHLORIDE

Example I 70 pounds $ZnCl_2$ in 50% Baumé solution
15 pounds NaCl
15 pounds KCl
100 pounds SAE 30 motor oil on top of batch. Batch heated by steam at 350–400° F. and completely crystallized in approx. 1¾ hours and temperature of anhydrous product at 320° F.

Example II 50 pounds $ZnCl_2$ in 50% Baumé solution
50 pounds NaCl
100 pounds SAE 30 motor oil on top of batch. Batch heated by steam at 350° F. and completely crystallized in approx. 2 hours and temperature of anhydrous product at 300° F.

The main advantages of our invention reside in the rapid crystallization of the zinc chloride and magnesium chloride solutions when the respective solution is boiled under a cover of heavy mineral oil after salt, in an amount substantially equal to from thirty to fifty percent of the total weight of the dehydrated product, has been added whereby the drying time is substantially halved over that required by other processes; in the fact that the cooking material need be no higher in temperature than the boiling point of the water to be removed; in the fact that a constant heating temperature can be employed; and in the fact that any cheap oil having a high boiling point may be used to seal the product from air, which oil need be merely floated on top of the cooking mass in an open kettle.

Although several examples of our invention have been herein disclosed it will be understood that details of our

We claim:

1. The method of dehydrating an aqueous solution of an inorganic alkaline earth metal halide selected from the group consisting of magnesium chloride and zinc chloride which comprises boiling the solution under a floated cover of mineral oil having at least a depth of about one inch after adding a quantity of a salt, from the group consisting of sodium chloride and potassium chloride, substantially equal to from 30 to 50 percent by weight of the total dehydrated product.

2. The method of dehydrating an aqueous solution of magnesium chloride which comprises adding to the solution a quantity of a salt, from the group consisting of sodium chloride and potassium chloride, substantially equal to from 30 to 50 percent by weight of the total dehydrated product and then boiling the mixture at ambient atmospheric pressure under an air excluding cover of mineral oil floating on the surface of the mixture and having at least a depth of about one inch.

3. The method of claim 2 wherein the added salt consists of substantially equal quantities of sodium chloride and potassium chloride.

4. The method of claim 2 wherein the quantity of added salt is substantially equal to 50 percent by weight of the total dehydrated product.

5. The method of dehydrating a water solution of zinc chloride which comprises adding to the solution a quantity of a salt, from the group consisting of sodium chloride and potassium chloride, substantially equal to from 30 to 50 percent by weight of the total dehydrated product, and then heating the mixture at ambient atmospheric pressure under an air excluding cover of floating mineral oil, having at least a depth of about an inch, until the zinc chloride and the salt are crystallized.

6. The method of claim 5 wherein the added salt consists of substantially equal quantities of sodium chloride and potassium chloride.

7. The method of claim 5 wherein the quantity of added salt is substantially equal to 50 percent by weight of the total dehydrated product.

8. The method of claim 5 wherein the mixture is heated above the boiling point of water and until the chlorides are dry, and then the remaining oil is removed by decantation.

References Cited by the Examiner

UNITED STATES PATENTS

| | | | |
|---|---|---|---|
| 845,868 | 3/07 | Fronek | 23—97 XR |
| 2,394,244 | 2/46 | Kokatnur | 23—97 XR |
| 2,417,772 | 3/47 | Marek | 23—91 |
| 2,928,722 | 3/60 | Scheller | 202—57 |
| 3,102,785 | 9/63 | Bristow | 202—57 |
| 3,156,630 | 11/64 | Fahnoe | 202—57 |

OTHER REFERENCES

Mellor, Comprehensive Treatise on Inorganic and Theoretical Chemistry, vol. 4, page 303.

NORMAN YUDKOFF, *Primary Examiner.*